United States Patent [19]

Braun et al.

[11] 4,287,830
[45] Sep. 8, 1981

[54] VEHICLE ADAPTED TO BE GUIDED ON TRACKS FOR THE PUBLIC LOCAL PASSENGER TRAFFIC WITH PIVOTAL REAR AXLE AND LONGITUDINAL GUIDE MEMBERS FOR SUCH AXLE

[75] Inventors: Dieter Braun, Weinstadt; Herbert Mehren, Ludwigsburg; Helmut Wulf, Ostfildern, all of Fed. Rep. of Germany

[73] Assignee: Daimler-Benz Aktiengesellschaft, Stuttgart, Fed. Rep. of Germany

[21] Appl. No.: 22,324

[22] Filed: Mar. 20, 1979

[30] Foreign Application Priority Data

Mar. 30, 1978 [DE] Fed. Rep. of Germany ....... 2813700

[51] Int. Cl.³ .............................................. B62D 1/26
[52] U.S. Cl. ................................... 104/247; 104/119; 105/144; 105/199 R; 180/131
[58] Field of Search ............ 104/118, 119, 242, 244.1, 104/245, 247; 180/79, 131; 105/141, 144, 168, 170, 182 R, 199 R, 215 R; 280/776

[56] References Cited

U.S. PATENT DOCUMENTS

| 2,270,242 | 1/1942 | Anderson | 104/247 UX |
| 2,551,443 | 5/1951 | Laukus, Sr. | 105/199 R |
| 3,111,912 | 11/1963 | Keiter | 105/141 |
| 3,712,239 | 1/1973 | Colovas et al. | 104/130 |

FOREIGN PATENT DOCUMENTS

| 1138809 | 10/1962 | Fed. Rep. of Germany ... 105/199 R |
| 2361734 | 6/1975 | Fed. Rep. of Germany ... 105/199 R |
| 2628218 | 1/1978 | Fed. Rep. of Germany ...... 104/247 |
| 2719705 | 11/1978 | Fed. Rep. of Germany ...... 104/247 |
| 2355703 | 1/1978 | France ................................. 104/247 |
| 677969 | 12/1964 | Italy .................................... 104/130 |

Primary Examiner—Randolph A. Reese
Attorney, Agent, or Firm—Craig and Antonelli

[57] ABSTRACT

A vehicle adapted to be selectively operated with or without guide rails or tracks, the vehicle including a steerable vehicle axle means having steerable wheels mounted thereon and at least one non-steerable vehicle axle having non-steerable wheels mounted thereon. The non-steerable vehicle axle is mounted so as to be pivotable in its entirety about a centrally positioned vertically extending pivot axis. Springs are provided for suspending a superstructure of the vehicle with a spring bracket fixedly mounted to an axle body of the non-steerable vehicle axle for supporting the springs at the vehicle. A ring mount segment is provided for mounting the springs at outer ends of the spring bracket so as to be horizontally movable with at least two supporting rollers, each having an axis of rotation disposed approximately toward a pivot center of the non-steerable axis, being attached to an underside of the springs. The supporting rollers are adapted to roll along a flat top side of the ring mount segments and at least one of a shape-mating lateral guide or a safety device is arranged on both sides of the supporting rollers adjacent a mounting arrangement for the supporting rollers. The guide is adapted to engage lateral edges of the ring mount segments and to be inserted, on a freely projecting underside of the ring mount segments, in a lateral groove provided in a shoulder formed at the supporting roller mounting device.

12 Claims, 6 Drawing Figures

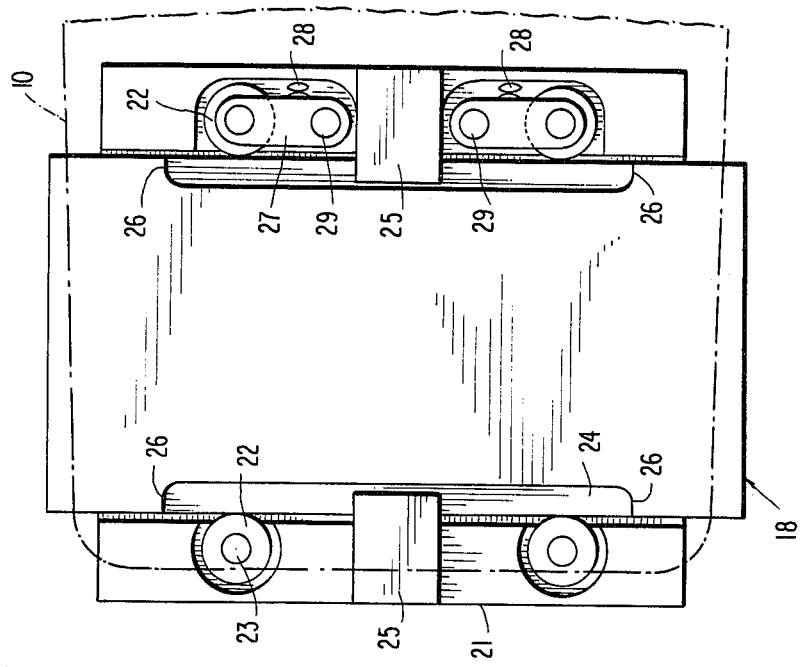
FIG.5
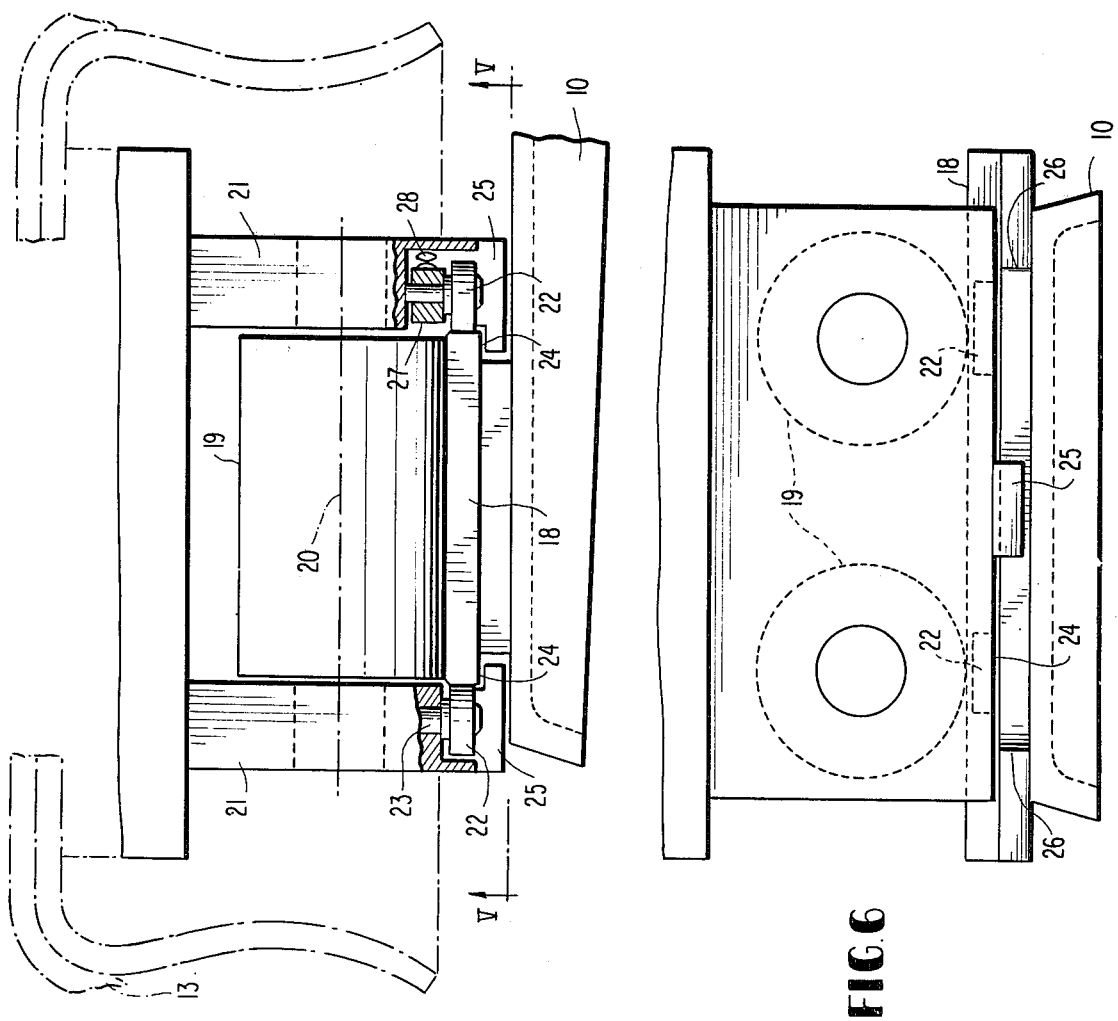
FIG.4
FIG.6

VEHICLE ADAPTED TO BE GUIDED ON TRACKS FOR THE PUBLIC LOCAL PASSENGER TRAFFIC WITH PIVOTAL REAR AXLE AND LONGITUDINAL GUIDE MEMBERS FOR SUCH AXLE

The present invention relates to a vehicle and, more particularly, to an automotive vehicle which is adapted to be selectively operated with or without rails or tracks especially for public short distance passenger service.

In German Laid-Open patent application P No. 27 19 705.3, a public passenger automotive vehicle is proposed which may be selectively utilized with or without rails or tracks with the vehicle being provided with an inherently steerable vehicle axle with steerable or turnable wheels mounted thereat and at least one inherently non-steerable vehicle axle having wheels thereon which are non-steerable relative thereto and with track-determining transverse guide rollers arranged in a zone of the vehicle axles on both sides of the vehicle wherein the inherently non-steerable vehicle axle is, in its entirety, mounted to the vehicle so that it is pivotable about a vertical pivot axis which is centrally positioned in the manner of a pivot mounting, and with spring brackets fixedly mounted to the body of the axle of the non-steerable axle which vehicle springs may be constructed as, air-cushion bellows, are horizontally movably attached to outer ends of the spring brackets.

In German Laid-Open patent application P No. 26 28 218.8, a short distance public passenger automotive vehicle is proposed which also may be selectively operated with or without rails or tracks with the vehicle being provided with an inherently steerable vehicle axle with steerable or turnable wheels and at least one inherently non-steerable vehicle axle having wheels thereon which are non-steerable relative thereto, and with track-determining transverse guide rollers arranged in a zone of the vehicle axles on both sides of the vehicle, wherein the inherently non-steerable vehicle axle in its entirety is also mounted to the vehicle so that it is pivotal within limits about a vertical pivot axis which is centrally positioned in the manner of a pivot mounting, and wherein two longitudinal control arms, determining the transverse position of the inherently non-steerable vehicle axle, are constructed so that they are variable in length in a manner of a telescopic system and are lockable in and/or releasable from a length required for an exact transverse positioning of the vehicle axle when the vehicle travels without being bound to rails or tracks.

In the last proposed vehicle construction, the pivotability of the rear axle of the rail or track bound vehicles in the manner of the pivot mounting has been proposed so that it is possible to follow the fixed track with minimum space consumption even in a curve zone of the rail or track. In this connection, the provision has been made to construct the longitudinal control arms, which upon manually controlled driving operation determine the transverse position of the non-steerable rear axle, to be inherently longitudinally variable and lockable in a normal position.

It has also been proposed to, inter alia, provide a rotational mobility of the rear non-steerable vehicle axle with respect to the vehicle superstructure about a high level axis by providing that the vehicle springs, resting on ends of spring supports or brackets which are attached, in turn, to the rear axle construction, are fastened to these ends in a horizontally movable fashion.

The aim underlying the present invention essentially resides in providing a vehicle construction of the aforementioned type which provides for an improved supporting and guidance of the control elements of the vehicle.

In accordance with advantageous features of the present invention, ring mount segments, extending concentrically to a pivot center of the non-steerable axle, are attached to outer ends of spring brackets with at least two supporting rollers being attached to an underside of the vehicle springs which rollers are oriented with their axis of rotation approximately toward the pivot center and travelling on a flat topside of the ring mount segments. A shape-mating lateral guide means or lift-off safety means is arranged on both sides beside the supporting roller mounting with the guide means engaging the lateral edges of the ring mount elements and being inserted, on the freely projecting underside of the ring mount segments, in a lateral groove in a shoulder or the like.

By virtue of the roller support mounting of the springs to ring mount segments in accordance with the present invention, a ready transverse displaceability between the spring bracket and the underside of the spring is attained during a pivoting of the non-steerable rear axle of the vehicle.

As to the type of spring for the vehicle to be selected, in accordance with the present invention, such spring should have a certain lateral stability, that is, a spring which produces on its own, upon a transverse stress of the lower bearing with respect to the upper bearing, a counter moment or counter force which counteracts such stress.

In accordance with further advantageous features of the present invention, the lateral guide means may be fashioned as a roller guide means with two lateral guide rollers having a vertical axis of rotation being held on each side of the supporting roller mounting.

Additionally, in accordance with the present invention, the lateral guide rollers may be elastically resiliently held on one side of the supporting roller mounting in parallel to an extension of the supporting roller axis and be pressed against the lateral edge of the ring mount segments.

In accordance with still further features of the present invention, on both sides centrally between the two supporting rollers, one hook shaped holding finger is arranged as a lift-off safety means with abutments being arranged at the ends of the ring mount segments at an end face side which abutments serve, in cooperation with the holding fingers, to limit the relative path of the supporting rollers toward the ring mount segments.

The supporting arms for the track-determining transverse guide rollers are, in accordance with the present invention, attached directly to spring brackets on the externally located sides thereof.

Accordingly, it is an object of the present invention to provide a vehicle construction of the aforementioned type which avoids, by simple means, shortcomings and disadvantages encountered in the prior art.

Another object of the present invention resides in providing a vehicle construction, especially for public short distance passenger service, which enables a ready transverse displaceability between a spring element support bracket of the vehicle and an underside of the spring during a pivoting of a non-steerable axle of the vehicle.

A still further object of the present invention resides in providing a vehicle construction which permits the utilization of vehicle springs capable of exhibiting a counter moment or counter force.

A still further object of the present invention resides in providing a vehicle construction, especially for public passenger service, which ensures an accurate guidance and support during operation with or without rails or guide tracks.

These and other objects, features, and advantages of the present invention will become more apparent from the following description when taken in connection with the accompanying drawings which show, for the purposes of illustration only, one embodiment in accordance with the present invention, and wherein:

FIG. 4 is a plan view of a spring bearing in accordance with the present invention in a peripheral direction of the pivotal movement;

FIG. 5 is a cross-sectional view of the spring bearing of FIG. 4 taken along the line V—V; and FIG. 6 is a lateral view of the spring bearing of FIG. 4.

Figure 1:
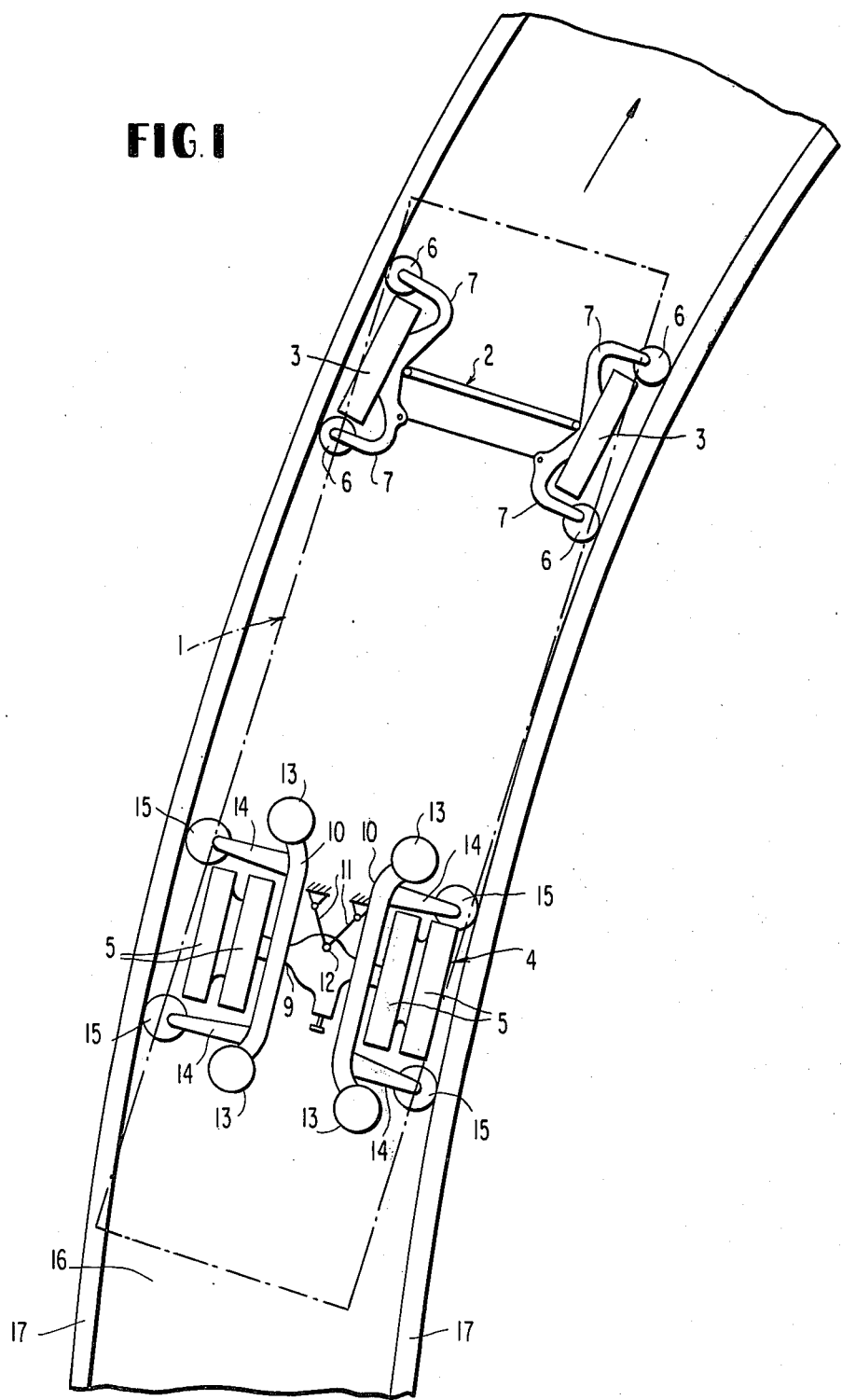
FIG. 1 is a partially schematic top view of a rail or track bound vehicle in a curved area of the track or rail with the vehicle having a pivotable non-steerable rear axle in accordance with the present invention.

Referring now to the drawings wherein like reference numerals are used throughout the various views to designate like parts and, more particularly, to FIG. 1, according to this figure, a transversely movable vehicle generally designated by the reference numeral 1, adapted to be selectively used with or without tracks or rails, is guided through a curve which includes a track or rail 16 and a vertical transverse guide bar 17 arranged on both sides of the track or rail 16. The vehicle 1 includes a steerable forward vehicle axle generally designated by the reference numeral 2 at which turnable or steerable wheels 3 are mounted as well as an inherently non-steerable rear vehicle axle generally designated by the reference numeral 4 at which vehicle wheels 5 are mounted. The vehicle wheels 5 are immovable or non-steerable relative to the rear axle 4; however, the rear axle 4 may be pivoted in its entirety about a centrally arranged high level axis 12.

Transverse guide rollers 6 are arranged forwardly and rearwardly of each of the wheels 3 in a zone of the front axle 2. The guide rollers are held by way of supporting arms 7 in fixed association with a plane of the wheels. By means of the transverse guide rollers, a steering moment is exerted on the front wheels 3 so that the wheels 3 are always aligned in parallel to the transverse guide bars 17. The wheels 3 here merely absorb standup forces and braking moments with the lateral forces being absorbed fully by the transverse guide rollers 6 and the supporting arms 7.

Similar considerations apply in connection with the pivotable rear axle 4. More particularly, the rear axle 4 includes an axle body 9 which carries spring brackets 10 which brackets are constructed so as to be bending-resistant and extend in a longitudinal direction of the vehicle 1. Air-cushion bellows 13 are supported at end points of the spring brackets 10 on which a vehicle superstructure is in turn supported in the vertical direction. The axle body 9 of the rear axle 4 is supported on the vehicle superstructure by, inter alia, triangularly disposed control arms 11 which determine the pivot center 12.

Supporting arms 14 are attached to externally located sides of the respective spring brackets 10 with the supporting arms in turn carrying, at external points, transverse guide rollers 15 for the rear axle 4. The guide rollers 15 are arranged forwardly and rearwardly of each of the wheels 5 on each side of the vehicle 1. By way of the transverse guide rollers and the supporting arms 14 or the spring brackets 10 aligning directional movements can be exerted by the transverse guide bars 17 on the rear axle 4 and the rear axle 4 can thereby be pivoted with respect to the vehicle superstructure into an accurate tangential direction. Thereby, the lateral displacement of the rear axle 4 on the inside of the curve, which can be absorbed with a rigid axle mounting and during travelling of the vehicle independently of a track or rail 16, can be avoided and such a vehicle 1 can function with a smaller width requirement when travelling along a track 16.

Figure 2:
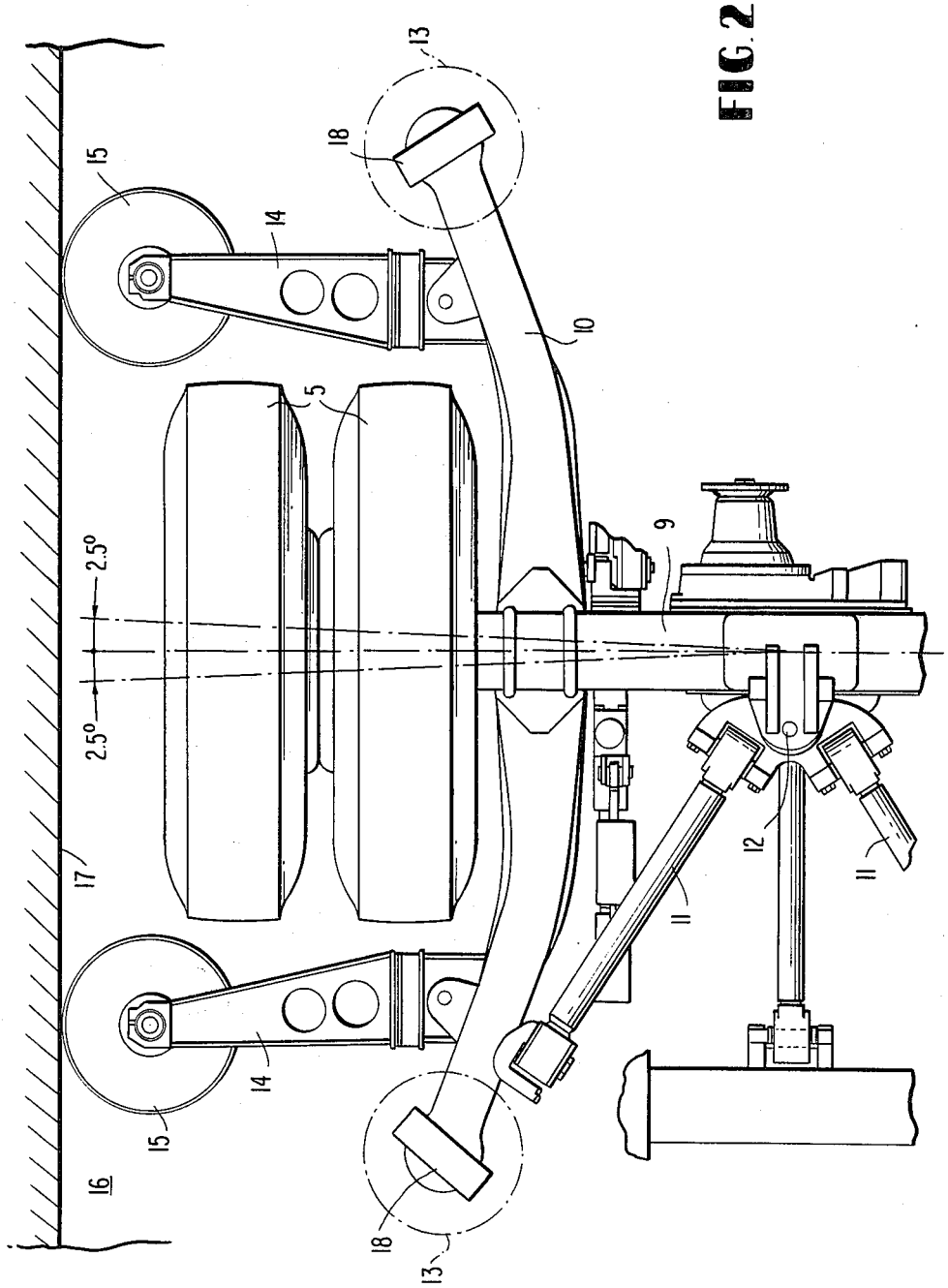
FIG. 2 is a top view of a portion of one side of the rear axle of the vehicle of FIG. 1.
Figure 3:
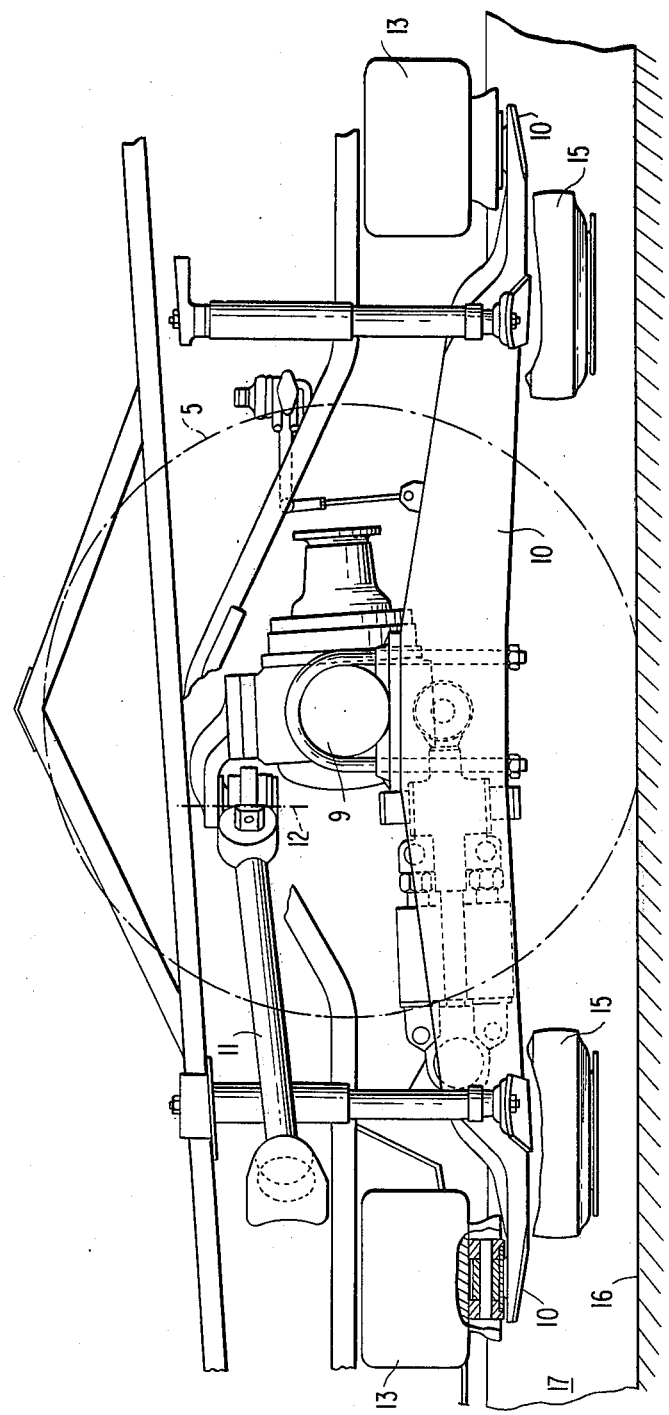
FIG. 3 is a partial side view of a portion of the rear axle of FIG. 1.

As shown in FIG. 2, short ring mount segments 18 are attached at the end points of the spring brackets 10 which are aligned to the pivot center 12 for the horizontal movable supporting of the air-cushion bellows 13 at the end points of the spring brackets 10. Since the rear axle needs to execute, for a normally occurring curve-traversing pivoting movement without lateral displacement on the inside of the curve, only pivotal motions within an angular range of ±2.5° about the exact transverse position of the rear axle 4, the ring mount segments 18 can be relatively short.

So as to form a bearing support, as shown in FIGS. 4 and 6, two supporting rollers 19 are rotationally movably mounted in supporting walls 21 on an underside of the respective air-cushion bellows 13 with an axis of rotation 20 of the supporting rollers 19 being aligned at least approximately toward the pivot center 12 of the rear axle 4. By virtue of this bearing or support arrangement, it is possible to provide for a ready relative displacement between the end of the spring brackets 10 and/or of the ring mount segments 18, on the one hand, and an underside of the air-cushion bellows 13, on the other hand, during a pivoting of the rear axle 4. Moreover, the bearing or support arrangement is low in noise, resistant to wear and tear, and insensitive to contamination by dirt or the like.

While the ring mount segments 18 are, for the sake of clarity, illustrated as rectangles in the drawings, in reality the ring mount segments 18 are constructed so as to be arcuate in correspondence with a distance from the pivot center 12.

As shown in FIGS. 4 and 5, guide rollers 22 mounted with a vertical axle 23 are inserted in cylindrical or knish-like recesses on an underside of the supporting walls 21. The guide rollers 22 cooperate with lateral edges of the ring mount segments 18 lying in parallel to a direction of rotation of the guide rollers 22 and ensure an exact peripheral travel of the supporting rollers 19 on the ring mount segments 18. The guide rollers 22 lying on one side of the ring mount segments 18 are fixedly arranged in the supporting walls 21. On an opposite side, the corresponding guide rollers 22 are supported in a rocker 27 which, in turn, is mounted with lateral deflection ability about a pivot bearing 29 and is pressed into place by cup springs 28 in a direction toward the lateral flanks of the ring mount segments 18.

As shown in FIGS. 4-6, a downwardly oriented shoulder 24 is arranged at the lateral flanks of the ring mount segments 18 with a lift-off safety means 25 engaging beneath the shoulder 24 in a manner of a curved holding finger. The lift-off safety means is also attached to an underside of the supporting walls 21. The shoulders and/or the free space formed thereby are limited in a peripheral direction by abutments 26 toward both directions and on both sides of the ring mount segments 18. The abutments 26 cooperate with the lift-off safety means 25 and serve for limiting the peripherally oriented displacement path of the supporting roller bearing relative to the ring mount segments 18.

While we have shown and described only one embodiment in accordance with the present invention, it is understood that the same is not limited thereto but is susceptible of numerous changes and modifications as known to one having ordinary skill in the art, and we therefore do not wish to be limited to the details shown and described herein, but intend to cover all such modifications as are encompassed by the scope of the appended claims.

We claim:

1. A vehicle adapted to be selectively operated with or without guide rails or tracks, the vehicle including a steerable vehicle axle means having steerable wheels mounted thereon and at least one non-steerable vehicle axle means having non-steerable wheels mounted thereon, means for mounting the non-steerable vehicle axle means so as to be pivotable in its entirety about a centrally positioned vertically extending pivot axis, spring means for suspending a superstructure of the vehicle, and spring bracket means fixedly mounted to an axle body for the non-steerable vehicle axle means for mounting the spring means to the vehicle, characterized in that ring mount segment means are provided for mounting the spring means at outer ends of the spring bracket means so as to be horizontally movable, at least two supporting roller means each having an axis of rotation disposed approximately toward a pivot center of the non-steerable axle means are attached to an underside of the spring means, said supporting roller means being adapted to roll along a flat top surface of the ring mount segment means, at least one of a shape-mating lateral guide means and a safety means arranged on both sides of the supporting roller means adjacent a mounting means for the supporting roller means, the guide means are adapted to engage lateral edges of the ring mount segment means on a freely projecting underside of the ring mount segments, said safety means lying in a lateral groove means provided in a shoulder of the ring mount segment means formed at the mounting means for the supporting roller means.

2. A vehicle according to claim 1, characterized in that transverse guide roller means are provided at each side of the vehicle in an area of the steerable and non-steerable vehicle axle means.

3. A vehicle according to claim 2, characterized in that the transverse guide roller means are disposed forwardly and rearwardly of the respective wheels of the vehicle.

4. A vehicle according to claim 3, characterized in that the vehicle spring means are formed as air-cushion bellow means.

5. A vehicle according to one of claims 1, 2, 3, or 4, characterized in that the lateral guide means are formed as roller guide means.

6. A vehicle according to one of claims 1, 2, 3, or 4, characterized in that at least a pair of lateral guide roller means each having a vertically extending axis of rotation are mounted at each side of the mounting means for the supporting roller means for guiding lateral surfaces of the ring mount segment means.

7. A vehicle according to claim 6, characterized in that means are provided for elastically resiliently urging one of the lateral guide roller means into engagement with a lateral surface of the ring mount segment means in parallel to an extension of the axis of rotation of the supporting roller means.

8. A vehicle according to claim 7, characterized in that the safety means includes at least one hood-shaped holding finger arranged essentially between the respective pairs of lateral guide roller means, and in that abutment means are provided at respective ends of the ring mount segments at an end face side for cooperation with the holding finger to limit a relative displacement path of the supporting roller means toward the ring mount segment means.

9. A vehicle according to claim 3, characterized in that supporting arm means are provided for mounting the transverse guide roller means to the spring bracket means on external sides thereof.

10. In a vehicle adapted to be selectively operated with or without guide rails or tracks, the vehicle including a steerable vehicle axle means having steerable wheels mounted thereon and at least one non-steerable vehicle axle means having non-steerable wheels mounted thereon, means for mounting the non-steerable vehicle axle means so as to be pivotable in its entirety about a centrally positioned vertically extending pivot axis, spring means for suspending a superstructure of the vehicle, and spring bracket means fixedly mounted to an axle body for the non-steerable vehicle axle means for mounting the spring means to the vehicle, the improvement comprising ring mount segment means provided for mounting the spring means at outer ends of the spring bracket means so as to be horizontally movable, and means to produce transverse displaceability between said spring bracket and the underside of said spring during pivoting of said non-steerable rear axle of said vehicle.

11. The improvement of claim 10, further comprising at least two supporting roller means each having an axis of rotation disposed approximately toward a pivot center of the non-steerable axle means are attached to an underside of the spring means, said supporting roller means being adapted to roll along a flat top surface of the ring mount segment means.

12. The improvement of claim 11, further comprising at least one of a shape-mating lateral guide means and a safety means arranged on both sides of the supporting roller means adjacent a mounting means for the supporting roller means, the guide means being adapted to engage lateral edges of the ring mount segment means on a freely projecting underside of the ring mount segments, said safety means lying in a lateral groove means provided in a shoulder of the ring mount segment means formed at the said mounting means for the supporting roller means.

* * * * *